United States Patent
Egbert

(10) Patent No.: US 6,714,556 B1
(45) Date of Patent: Mar. 30, 2004

(54) IN-BAND MANAGEMENT OF A STACKED GROUP OF SWITCHES BY A SINGLE CPU

(75) Inventor: Chandan Egbert, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 737 days.

(21) Appl. No.: 09/618,057

(22) Filed: Jul. 17, 2000

(51) Int. Cl.[7] .............................................. H04L 12/56
(52) U.S. Cl. ....................... 370/423; 370/428; 370/356; 370/389; 370/401; 709/239; 709/208; 709/249; 710/100
(58) Field of Search ........................ 370/401, 402–403, 370/413–418, 469, 471, 389–394, 352–354, 355–356, 422–424, 428; 711/3, 147–149, 169; 709/238, 245, 249, 239–242, 217–219, 208; 710/100

(56) References Cited

U.S. PATENT DOCUMENTS

| | | | |
|---|---|---|---|
| 5,953,335 A | | 9/1999 | Erimli et al. |
| 6,084,878 A | | 7/2000 | Crayford et al. |
| 6,192,428 B1 | * | 2/2001 | Abramson et al. ............. 710/52 |
| 6,205,123 B1 | * | 3/2001 | Nakatsugawa .............. 370/257 |
| 6,314,106 B1 | * | 11/2001 | King et al. .................. 370/412 |
| 6,434,676 B1 | * | 8/2002 | Perloff ........................ 711/154 |
| 6,445,709 B1 | * | 9/2002 | Chiang ....................... 370/399 |
| 6,446,173 B1 | * | 9/2002 | Pham ......................... 711/147 |
| 6,457,053 B1 | * | 9/2002 | Satagopan et al. .......... 709/226 |
| 6,463,032 B1 | * | 10/2002 | Lau et al. .................... 370/218 |
| 6,504,843 B1 | * | 1/2003 | Cremin et al. .............. 370/389 |
| 6,515,993 B1 | * | 2/2003 | Williams et al. ........ 370/395.53 |
| 6,526,056 B1 | * | 2/2003 | Rekhter et al. .............. 370/392 |
| 6,560,227 B1 | * | 5/2003 | Bartoldus et al. ............ 370/390 |
| 6,560,229 B1 | * | 5/2003 | Kadambi et al. ............ 370/392 |
| 6,574,240 B1 | * | 6/2003 | Tzeng ......................... 370/469 |
| 6,584,106 B1 | * | 6/2003 | Merchant et al. ....... 370/395.32 |

OTHER PUBLICATIONS

Architecture for Stackable Hub Management, IBM Technical Disclosure Bulletin, IBM Corp., New York, US, vol. 39, No. 2, pp. 3–9.

* cited by examiner

Primary Examiner—Kenneth Vanderpuye
Assistant Examiner—Van Nguyen
(74) Attorney, Agent, or Firm—Manelli Denison & Selter PLLC; Leon R. Turkevich

(57) ABSTRACT

A switching system includes switches, each having a host processing unit and a switching unit, and a backbone link configured for transferring data packets between the switching units. One of the host processing units is configured as a master unit for generating a data frame having a destination address for a selected one of the switching units of a corresponding selected one of the other host processing units. The master unit outputs the data frame to the corresponding switching unit for transfer to the selected one switching unit via the backbone link. The selected one switching unit, in response to receiving the data frame having the corresponding destination address, forwards the data frame to the corresponding host processing unit for execution of a processing operation specified in the data frame. Hence, the switching system provides inter-processor communications using a preexisting backbone link, eliminating the necessity of a processor bus.

14 Claims, 2 Drawing Sheets

IN-BAND MANAGEMENT OF A STACKED GROUP OF SWITCHES BY A SINGLE CPU

BACKGROUND OF THE INVENTION

1. Field of the Invention

The present invention relates to management of a stack of layer 2 switches configured for switching data packets.

2. Background Art

Local area networks use a network cable or other media to link stations on the network. Each local area network architecture uses a media access control (MAC) enabling network interface devices at each network node to access the network medium.

The Ethernet protocol IEEE 802.3 has evolved to specify a half-duplex media access mechanism and a full-duplex media access mechanism for transmission of data packets. The full-duplex media access mechanism provides a two-way, point-to-point communication link between two network elements, for example between a network node and a switched hub.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received data packet may include a VLAN (virtual LAN) tagged frame according to IEEE 802.1q protocol that specifies another subnetwork (via a router) or a prescribed group of stations. The network switch includes multiple switch ports configured for sending and receiving data packets to respective network nodes according to IEEE 802.3 protocol, plus a management port that enables an external management entity to control overall operations of the switch using a management MAC interface. Hence, a host controller such as a host CPU can access the network switch chip via a standard MAC layer protocol.

FIG. 1 is a diagram illustrating a switch rack 10 having a stacked group of switches 12 for deployment of a local area network, managed by a remote management station 20. Each switch 12 has an integrated multiport switch 14 as disclosed in U.S. Pat. No. 5,953,355, plus a corresponding host CPU 16 for controlling the corresponding integrated multiport switch 14. Remote management software executed by the remote management station 20 manages the switches 12 by instructing a master CPU to read and write control/status registers in the switch chips 14. The switch rack 10 also includes a CPU bus 18 configured for communications between the CPUs 16, and an backbone link 22 for transfer of data frames between the integrated multiport switches 14. In particular, one of the CPUs 16a is designated as the master CPU and the remaining CPUs (e.g., 16b) are designated as slave CPUs, eliminating the necessity for the remote management station 20 to communicate with each of the individual CPUs 16. Hence, the remote management station 20 need only communicate with the master CPU 16a, with the master CPU 16a controlling the remaining slave CPUs (e.g., writing information into CPU control/status registers) via the CPU bus 18.

Use of the CPU bus 18, however, increases the required pin count of the CPUs 16, and the complexity of the switch rack 10.

SUMMARY OF THE INVENTION

There is a need for an arrangement that enables communication between multiple host processing units, configured for controlling respective network switch devices, without the necessity of a separate CPU bus.

These and other needs are attained by the present invention, where a switching system includes switches, each having a host processing unit and a switching unit, and a backbone link configured for transferring data packets between the switching units. One of the host processing units is configured as a master unit for generating a data frame having a destination address for a selected one of the switching units of a corresponding selected one of the other host processing units. The master unit outputs the data frame to the corresponding switching unit for transfer to the selected one switching unit via the backbone link. The selected one switching unit, in response to receiving the data frame having the corresponding destination address, forwards the data frame to the corresponding host processing unit for execution of a processing operation specified in the data frame. Hence, the switching system provides interprocessor communications using a preexisting backbone link, eliminating the necessity of a processor bus.

One aspect of the present invention provides a method in a network switching system having multiple switching units controlled by respective host processing units. The method includes generating a data frame by a first of the host processing units, configured as a master unit, by including a destination address of a selected one of the switching units controlled by a corresponding selected one of the other host processing units. The method also includes outputting the data frame from the master unit to the corresponding switching unit, transferring the data frame from the switching unit having received the data frame from the master unit to the selected one switching unit via a backbone link, and forwarding the data frame from the selected one switching unit to the corresponding selected one other host processing unit, for execution of a processing operation specified in the data frame, based on the selected one switching unit detecting the destination address matching an assigned address of the selected one switching unit.

Another aspect of the present invention provides a switching system configured for receiving commands from a remote manager. The system includes switches and a backbone link. Each switch has a switching unit, having an assigned network address, and a corresponding host processing unit configured for controlling the corresponding switching unit. One of the host processing units is configured for receiving a command from the remote manager and in response generating a data frame having a destination address for configuration of a selected one of the switching units by the corresponding selected one of the other host processing units. Each switching unit is configured for forwarding a received data frame having a matching destination address to the corresponding host processing unit. The backbone link is configured for transferring the data frame from the switching unit corresponding to the one host processing unit to the selected switching unit, and the selected one other host processing unit is configured for executing a processing operation specified in the data frame based on retrieval of the data frame from the corresponding selected switching unit.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

Figure 2:
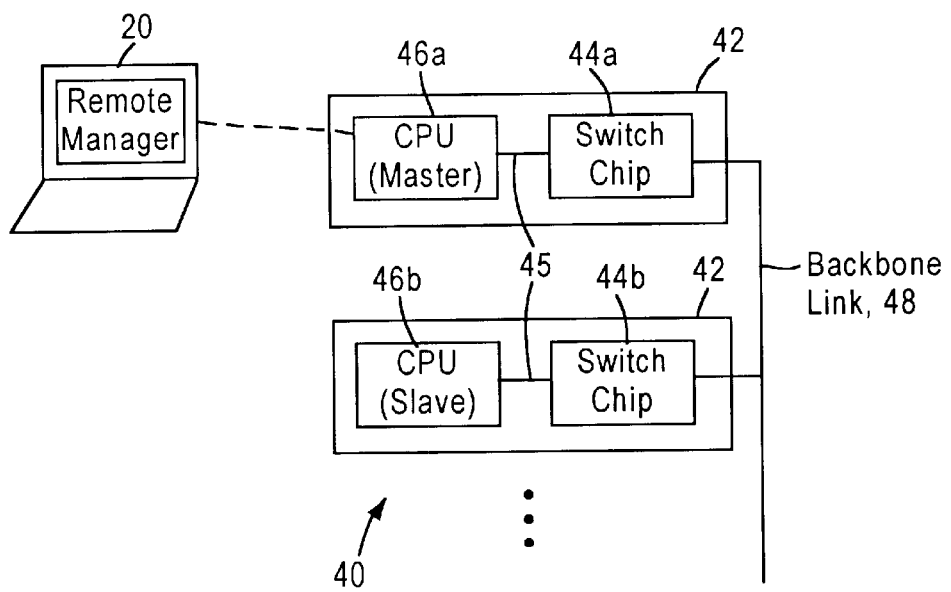
FIG. 2 is a block diagram of a stacked rack of managed switches according to an embodiment of the present invention.

FIG. 2 is a block diagram illustrating a switch rack 40 having a stacked group of switches 42 for a packet switched network, such as an Ethernet (IEEE 802.3) network. Each switch 42 includes an integrated (i.e., single chip) multiport switch 44, also referred to as a switching unit, similar to the switch described in U.S. Pat. No. 5,953,355, that enables communication of data packets between network stations, for example a client workstation, at 10 Mbps or 100 Mbps according to IEEE 802.3 protocol. Each switch 42 also includes a corresponding host processing unit 46 configured for controlling the corresponding switching unit 44 via a link 45, for example a PCI local bus or a MAC (EEE 802.3) based data link. Each of the integrated multiport switches 44 are interconnected by a backbone link 48, implemented for example as a gigabit Ethernet link coupled to expansion ports of the switch chips 44, enabling transfer of data packets between subnetworks served by the respective switch chips 44.

One of the host processing units, for example unit 46a, is configured as a master unit for reception of commands from the remote manager 20. In particular, the remote manager 20 sends instructions to the master CPU 46a to perform processing operations, for example reading and writing information from and to control/status registers in the switch chips 44. The master CPU 46a in turn sends data frames to the remaining host processing units (i.e., slave CPUs), such as processing unit 46b, instructing the slave CPUs to perform the same processing operations requested by the remote manager 20.

Figure 1:
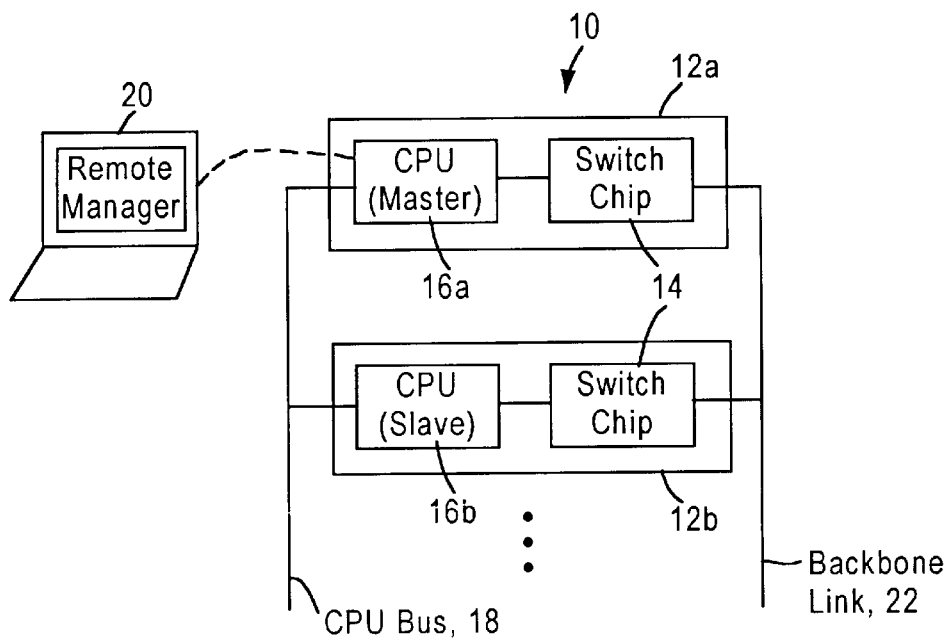
FIG. 1 is a diagram illustrating a conventional (prior art) stacked rack of managed switches.
Figure 3:
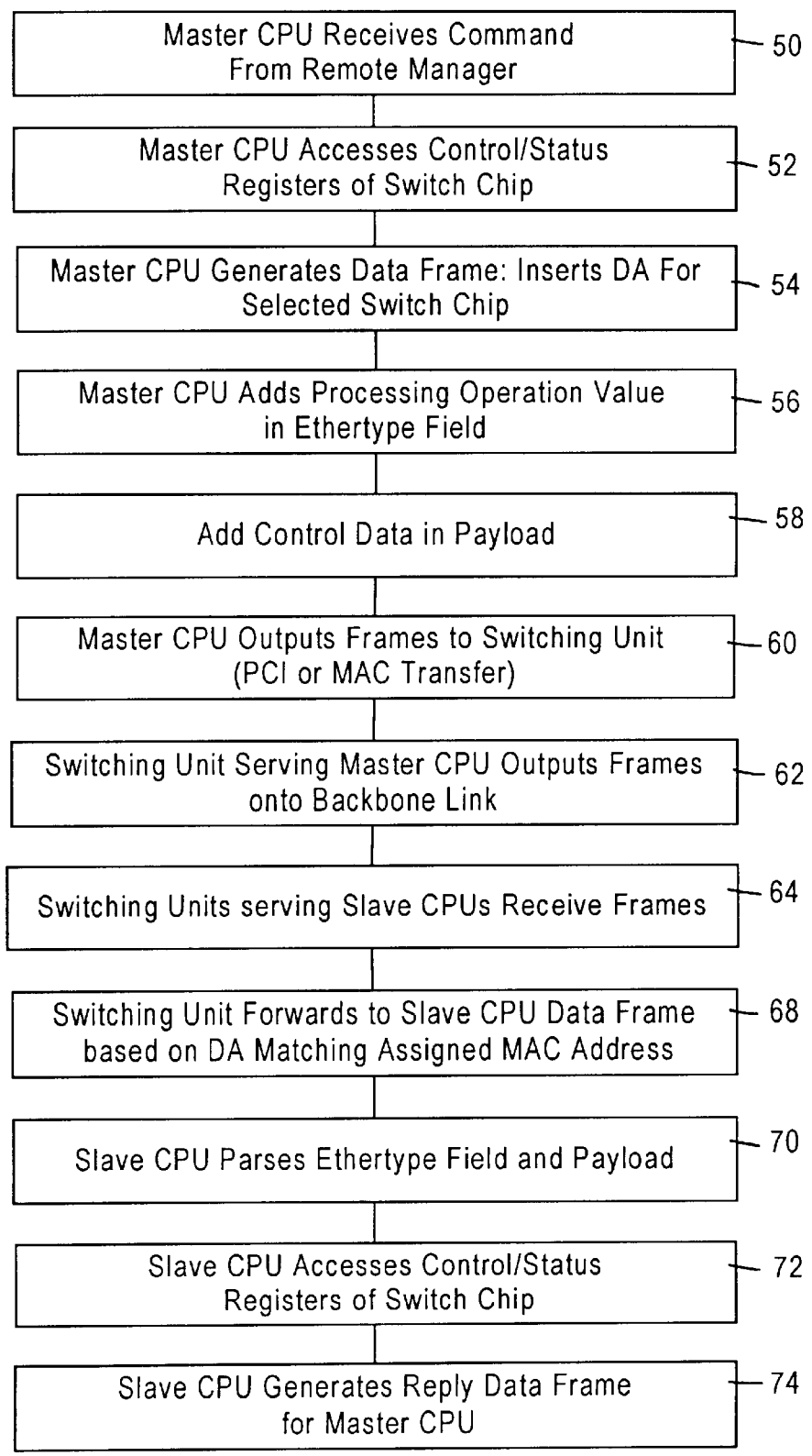
FIG. 3 is a diagram illustrating the method of managing multiple switching units using a master host processing unit according to an embodiment of the present invention.

FIG. 3 is a flow diagram illustrating the method of sending commands to slave CPUs 46 via the backbone link 48 according to an embodiment of the present invention. As described below, the sending of commands to the slave CPUs via the backbone link 48 eliminates the necessity of the CPU bus of FIG. 1.

The method begins in step 50, where the master CPU 46a receives a command from the remote manager 20. A command from the remote manager 20 may specify greeting or writing data to a prescribed control/status register in the switching unit 44. The master host processing unit 46a responds to the command from the remote manager 20 by performing the appropriate processing operation within the corresponding switching unit 44a in step 52. The master host processing unit 46a then generates a data frame for each of the slave processing units (e.g., 46b) by inserting the destination address for the corresponding selected switching unit 44 in step 54, by adding a prescribed value specifying the processing operation within the Ethertype field in step 56, and adding the remaining data for execution of the processing operation within the payload in step 58. In particular, the Ethertype field is a 16-bit value, where certain values are unused in Ethernet protocol; accordingly, the unused values are utilized to specify prescribed operations for the slave CPUs.

The master host processing unit 46a outputs each of the data frames to the corresponding switching unit 44a via the link 45 in step 60, for example as a management frame or as a PCI transfer. The switching unit 44a, recognizing from its internal frame forwarding tables that the destination addresses are reachable a via the backbone link 48, outputs the data frames in step 62 onto the backbone link 48.

The switching units (e.g., 44b) corresponding to the slave CPUs receive the data frames in step 64, and perform a lookup of the destination address in order to make a frame forwarding decision. Each slave switching unit 44 forwards the received data frame to the corresponding host processing unit 46 via the corresponding link 45 in step 68 based on a determined match between the destination MAC address and the assigned MAC address of the switching unit 44. Hence, each slave CPU (e.g., 46b) is able to receive the corresponding data frame from the master CPU 46a based on a match between the destination address in the received data frame and the assigned MAC address of the corresponding switching unit 44.

The slave CPU 46b, having received the data frame, parses the data frame in step 70 and determines from the Ethertype field and the payload the processing operation to be performed. The slave CPU 46b performs the specified processing operation (e.g., reading or writing to a control/status register in the corresponding switching unit 44) in step 72, and generates in step 74 a reply data frame for the master CPU 46a acknowledging execution of the requested processing operation.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network switching system having multiple switching units controlled by respective host processing units, the method comprising:

generating a data frame by a first of the host processing units, configured as a master unit, by including a destination address of a selected one of the switching units controlled by a corresponding selected one of the other host processing units;

outputting the data frame from the master unit to the corresponding switching unit controlled by the master unit;

transferring the data frame from the switching unit having received the data frame from the master unit to the selected one switching unit via a backbone link; and forwarding the data frame from the selected one switching unit to the corresponding selected one other host processing unit, for execution of a processing operation specified in the data frame, based on the selected one switching unit detecting the destination address matching an assigned address of the selected one switching unit.

2. The method of claim 1, wherein the generating step includes inserting a prescribed value specifying at least a portion of the processing operation in an Ethertype field within the data frame.

3. The method of claim 2, wherein the transferring step includes outputting the data frame onto the backbone link according to IEEE 802.3 protocol.

4. The method of claim 2, wherein the outputting step includes outputting the data frame from the master unit to the corresponding switching unit according to IEEE 802.3 protocol.

5. The method of claim 2, wherein the outputting step includes outputting the data frame from the master unit to the corresponding switching unit using a peripheral component interconnect (PCI) bus transfer.

6. The method of claim 1, wherein the generating step includes generating the data frame based on a command received from a remote manager.

7. The method of claim 6, wherein the generating step further includes configuring by the master unit each of the other host processing units, based on the command received from the remote manager, by generating a corresponding data frame having a destination address specifying the corresponding switching unit.

8. The method of claim 6, further comprising configuring the selected one switching unit by the corresponding selected one other host processing unit based on parsing the received data frame.

9. The method of claim 8, wherein the configuring step includes writing prescribed values, recovered from the received data frame, into control/status registers within the selected one switching unit specified by the received data frame.

10. A switching system configured for receiving commands from a remote manager, the system comprising:

switches, each having a switching unit, having an assigned network address, and a corresponding host processing unit configured for controlling the corresponding switching unit, one of the host processing units configured for receiving a command from the remote manager and in response generating a data frame having a destination address for configuration of a selected one of the switching units by the corresponding selected one of the other host processing units, each switching unit configured for forwarding a received data frame having a matching destination address to the corresponding host processing unit; and a backbone link configured for transferring the data frame from the switching unit corresponding to the one host processing unit to the selected switching unit, the selected one other host processing unit configured for executing a processing operation specified in the data frame based on retrieval of the data frame from the corresponding selected switching unit.

11. The system of claim 10, wherein the one host processing unit inserts a value within an Ethertype field of the data frame that specifies at least a portion of the processing operation.

12. The system of claim 11, wherein the backbone link is configured for transferring the data frame according to IEEE 802.3 protocol.

13. The switch of claim 10, wherein the selected one other host processing unit is configured for writing prescribed values, recovered from the received data frame, into control/status registers within the selected one switching unit specified by the received data frame.

14. The switch of claim 10, wherein the selected one other host processing unit is configured for generating a second data frame having the destination address of the switching unit corresponding to the one host processing unit and specifying results based on the processing operation.

* * * * *